US010616553B1

(12) United States Patent
Russell et al.

(10) Patent No.: US 10,616,553 B1
(45) Date of Patent: Apr. 7, 2020

(54) GENERATING AN IMAGE-BASED IDENTIFIER FOR A STRETCH WRAPPED LOADED PALLET BASED ON IMAGES CAPTURED IN ASSOCIATION WITH APPLICATION OF STRETCH WRAP TO THE LOADED PALLET

(71) Applicant: X Development LLC, Mountain View, CA (US)

(72) Inventors: Jared Stephen Russell, San Francisco, CA (US); Julian Mac Neille Mason, Redwood City, CA (US)

(73) Assignee: X DEVELOPMENT LLC, Mountain View, CA (US)

( * ) Notice: Subject to any disclaimer, the term of this patent is extended or adjusted under 35 U.S.C. 154(b) by 0 days.

(21) Appl. No.: 16/665,232

(22) Filed: Oct. 28, 2019

Related U.S. Application Data

(63) Continuation of application No. 15/799,981, filed on Oct. 31, 2017, now Pat. No. 10,491,881, which is a
(Continued)

(51) Int. Cl.
| | |
|---|---|
| *G06K 9/00* | (2006.01) |
| *H04N 13/204* | (2018.01) |
| *H04N 13/257* | (2018.01) |
| *G06T 17/20* | (2006.01) |
| *B65G 69/00* | (2006.01) |
| *G06K 9/62* | (2006.01) |
| *B65D 19/38* | (2006.01) |
| *H04N 7/18* | (2006.01) |

(Continued)

(52) U.S. Cl.
CPC .......... *H04N 13/204* (2018.05); *B65D 19/38* (2013.01); *B65G 69/00* (2013.01); *G06K 9/6201* (2013.01); *G06T 7/33* (2017.01); *G06T 7/90* (2017.01); *G06T 17/20* (2013.01); *H04N 5/372* (2013.01); *H04N 7/181* (2013.01); *H04N 13/257* (2018.05); *G06T 2207/10021* (2013.01)

(58) Field of Classification Search
CPC combination set(s) only.
See application file for complete search history.

(56) References Cited

U.S. PATENT DOCUMENTS

| | | |
|---|---|---|
| 6,219,992 B1 | 4/2001 | Maki-Rahkola et al. |
| 7,269,935 B2 | 9/2007 | Jafari |
| | | (Continued) |

FOREIGN PATENT DOCUMENTS

| | | |
|---|---|---|
| WO | 2007012352 | 2/2007 |
| WO | 2011087454 | 7/2011 |

*Primary Examiner* — Alex Kok S Liew
(74) *Attorney, Agent, or Firm* — Middleton Reutlinger

(57) ABSTRACT

Methods, apparatus, systems, and computer-readable media are provided that relate to using one or more vision sensors to capture images of a loaded pallet in association with application of stretch wrap to the loaded pallet by an automated pallet wrapping machine. The images are used to generate an image-based identifier for the loaded pallet that is then used for pallet identification by mobile robots and/or other automated agents in a warehouse or other environment. In some implementations, the images are captured by the vision sensor when the pallet is in the wrapping area of the automated pallet wrapping machine and while the vision sensor and/or the pallet are rotating. In some implementations, the image-based identifier may be assigned to pallet attributes and/or a de-palletizing scheme of the loaded pallet.

20 Claims, 7 Drawing Sheets

Related U.S. Application Data continuation of application No. 14/861,825, filed on Sep. 22, 2015, now Pat. No. 9,826,213.

(51) Int. Cl.
    *G06T 7/90*     (2017.01)
    *G06T 7/33*     (2017.01)
    *H04N 5/372*     (2011.01)

(56) References Cited

U.S. PATENT DOCUMENTS

| | | |
|---|---|---|
| 9,205,562 B1 | 12/2015 | Konolige et al. |
| 2002/0010519 A1 | 1/2002 | Watanabe et al. |
| 2004/0073359 A1 | 4/2004 | Ichijo et al. |
| 2008/0307754 A1 | 12/2008 | Storig et al. |
| 2012/0057022 A1 | 3/2012 | Nechiporenko et al. |
| 2015/0078877 A1 | 3/2015 | Brandmuller et al. |
| 2015/0101281 A1 | 4/2015 | Kudia |
| 2016/0129592 A1 | 5/2016 | Saboo et al. |
| 2016/0132059 A1 | 5/2016 | Mason et al. |

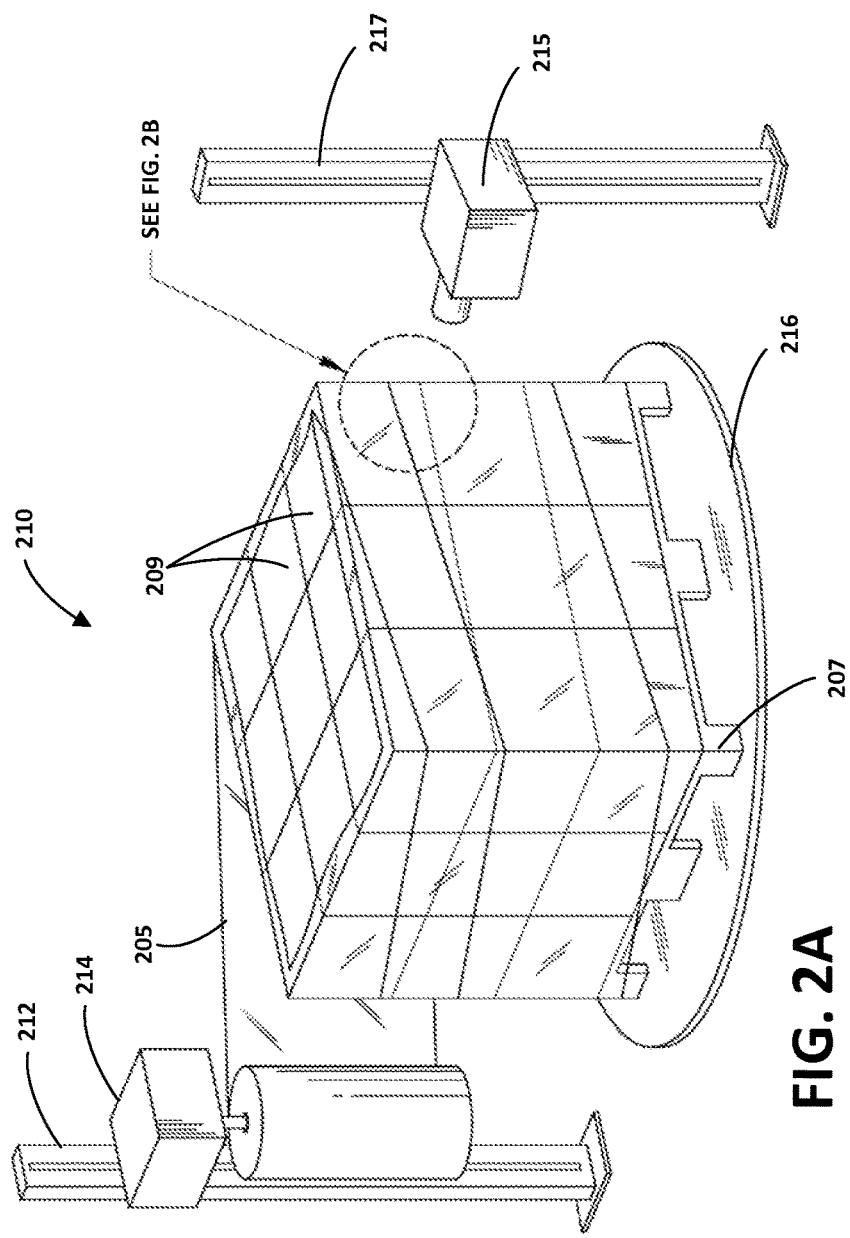
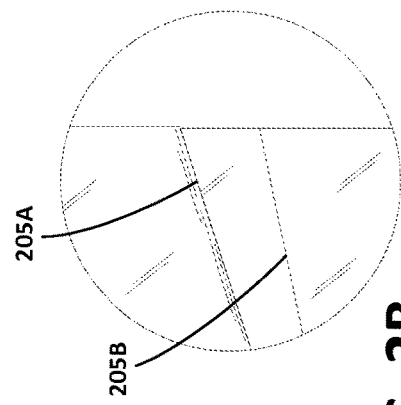
FIG. 2A
FIG. 2B

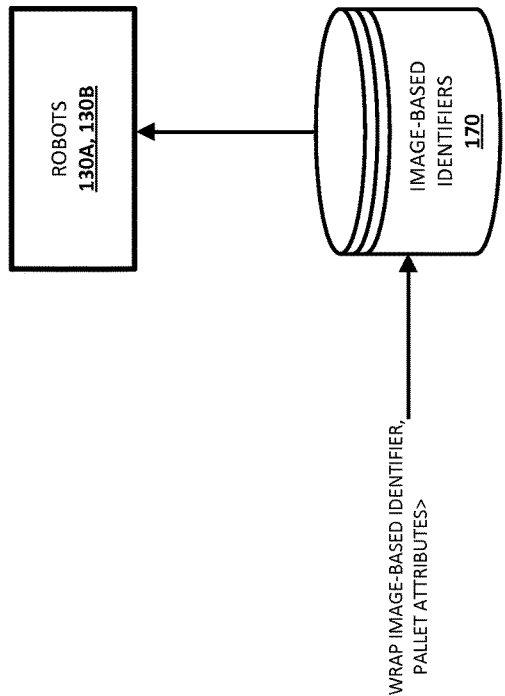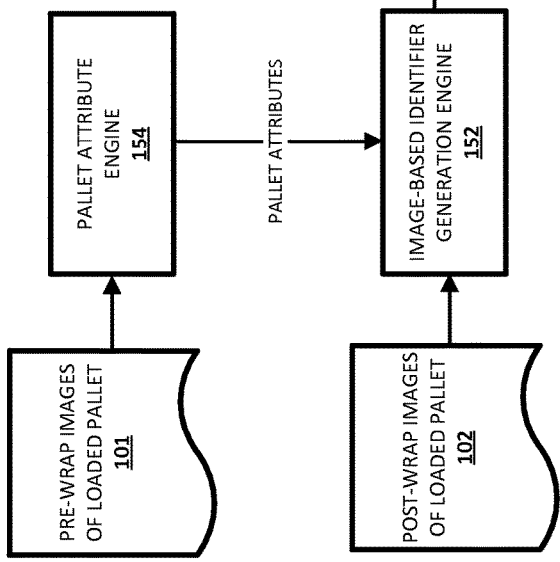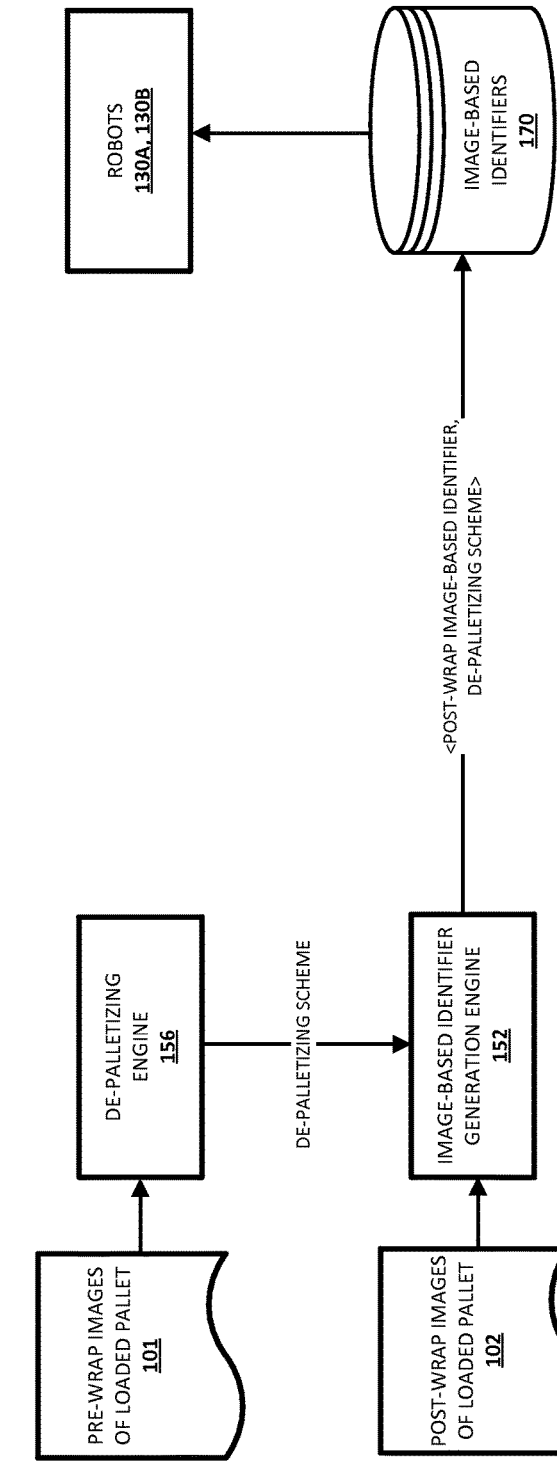
FIG. 5
FIG. 6

GENERATING AN IMAGE-BASED IDENTIFIER FOR A STRETCH WRAPPED LOADED PALLET BASED ON IMAGES CAPTURED IN ASSOCIATION WITH APPLICATION OF STRETCH WRAP TO THE LOADED PALLET

BACKGROUND

Automated pallet wrapping machines are often used in industrial environments. Automated pallet wrapping machines apply clear stretch wrap around a load of a pallet and optionally to a portion of the pallet itself. The stretch wrap is applied to stabilize the loaded pallet for transport, to protect the load of the loaded pallet, and/or for one or more other purposes. As one example of an automated pallet wrapping machine, a so-called "turntable wrapper" rotates a loaded pallet on a turntable while applying clear stretch wrap from a roll of stretch wrap during the rotation. The roll of stretch wrap may optionally move up and/or down a fixed mast during the application. As another example, some automated pallet wrapping machines apply stretch wrap to a loaded pallet by rotating the stretch wrap around a loaded pallet while the loaded pallet remains stationary. Examples of such automated pallet wrapping machines are so-called "rotary arm wrappers" and "rotary ring wrappers."

Separately, one or more pallets that are present in some industrial environments may include pallet identifiers such as fiducial markers (e.g., a quick response (QR) code or other barcode, an alphanumeric tag, an AprilTag) and/or radio-frequency identification (RFID) tags. However, applying those pallet identifiers and/or detecting such pallet identifiers after application may suffer from one or more drawbacks. For example, applying those pallet identifiers may involve tedious steps and/or specialized machinery. Also, for example, some fiducial markers may be easily obstructed, which may obscure detection. As yet another example, RFID tags may have limited detection ranges. Additional and/or alternative drawbacks of the aforementioned techniques and/or other techniques may be presented.

SUMMARY

Aspects of the present disclosure are directed to using one or more vision sensors (e.g., a stereographic camera) to capture images (e.g., color images with depth) of a loaded pallet during or after stretch wrap is applied to the loaded pallet by a pallet wrapping machine—and using the images to generate a post-wrap image-based identifier for the loaded pallet that is then used for identification of the loaded pallet by mobile robots and/or other automated agents (e.g., fixed and/or mobile cameras of an automated system) in one or more warehouses or other environments. The images captured by the vision sensor each capture a corresponding portion of the loaded pallet with the stretch wrap applied to the corresponding portion.

As one example, the vision sensor may be positioned out of phase (e.g., approximately 180 degrees out of phase) with the wrap application point of a turntable wrapper automated pallet wrapping machine and may capture images as a loaded pallet is rotated on the turntable of the turntable wrapper. The vision sensor captures images of the loaded pallet "post-wrap"—which may include capturing images of stretch wrapped portions while other portions are still being stretch wrapped and/or capturing images after the stretch wrapping is completed (e.g., in one or more rotations of the loaded pallet following completion of the stretch wrapping of the loaded pallet). As another example, the vision sensor may rotate around the loaded pallet "post-wrap", while the loaded pallet optionally remains stationary. For instance, the vision sensor may be coupled to an arm of a rotary arm wrapper automated wrapping machine and/or to a ring of a rotary ring wrapper automated wrapping machine.

The post-wrap image-based identifier captures one or more visible features of the stretch wrap as applied to the loaded pallet, and optionally one or more visible features of the load of the loaded pallet that may be visible through the stretch wrap. The post-wrap image-based identifier may be, for example, a set of the captured images (e.g., one or more images from each "side" of the loaded pallet), a three dimensional ("3D") model of the loaded pallet that is generated based on the captured images, and/or a set of derived features derived from the captured images. Various derived features of images may be utilized such as edges based on the "wrinkles" in the stretch wrap, "edges" based on overlaps of the stretch wrap, "edges" based on what is behind the stretch wrap, etc. In some implementations, the post-wrap image-based identifier may include a plurality of identifiers, which may be used individually and/or collectively to identify the loaded pallet. For example, the post-wrap image-based identifier may include a first side image-based identifier based on at least one of the images that captures a first side of the loaded pallet, a second side image-based identifier based on at least one of the images that captures a second side of the loaded pallet, etc. An automated agent may determine a subsequently captured image of the second side of the loaded pallet matches the post-wrap image-based identifier based on it matching the second side image-based identifier (without necessarily determining that another image matches the first side image-based identifier).

In some implementations, the post-wrap image-based identifier may be used to keep track of the loaded pallet. As one example, an additional vision sensor of a robot may capture an image of the loaded pallet with the stretch wrap applied and the robot may determine that the image matches the post-wrap image-based identifier based on comparing the image to the post-wrap image-based identifier. The robot may further determine a pose (position and/or orientation) of the loaded pallet with the stretch wrap applied (e.g., using its own position and/or a determined position of the loaded pallet relative to itself) and provide an indication of the post-wrap image-based identifier and an indication of the pose to an inventory tracking system.

In some implementations, the post-wrap image-based identifier may be assigned to one or more attributes of the loaded pallet such as one or more identifiers of contents of the loaded pallet, an identifier of a destination of the loaded pallet, a unique identifier for the loaded pallet, an identifier indicating loaded height, width, and/or length of the loaded pallet, and/or an identifier corresponding to a time that the stretch wrap was applied to loaded pallet. In some of those implementations, one or more of the attributes may be identified from a warehouse management system that tracks contents of pallets being wrapped by an automated wrapping machine. In some of those implementations, one or more of the attributes may additionally or alternatively be identified by the vision sensor and/or an additional vision sensor. For example, and as described below, the vision sensor may also capture images of the loaded pallet "pre-wrap" and use barcodes or other fiducial markings of loaded boxes (or other items) in the pre-wrap images to determine identifiers of the contents of the loaded pallet.

When an image-based identifier is assigned to attributes of the loaded pallet, an additional vision sensor of a robot may capture an image of the loaded pallet with the stretch wrap applied and the robot may determine that the image matches the image-based identifier based on comparing the image to the image-based identifier. The robot may further identify the attributes of the loaded pallet based on determining that the image matches the image-based identifier and perform one or more actions to the loaded pallet based on at least one of the attributes.

In some implementations, images may be captured of the loaded pallet both "pre-wrap" and "post-wrap". The "post-wrap" images may be used to generate a post-wrap image-based identifier as described above for identification of the loaded pallet while it is wrapped. In some implementations, the "pre-wrap" images may be used to generate an additional pre-wrap image-based identifier that may be used for identification of the loaded pallet after the stretch is wrap removed (e.g., for identifying a particular unwrapped loaded pallet to de-palletize). In some implementations, the "pre-wrap" images may be used to determine one or more attributes of the loaded pallet as described above. In some implementations, the "pre-wrap" images may be used to generate a de-palletizing scheme for the loaded pallet that may be utilized at a future time by one or more robots to de-palletize the loaded pallet.

In some implementations, "marked stretch wrap" may be utilized instead of typically applied clear plastic wrap. Marked stretch wrap includes a plurality of non-transparent markings and effectively puts a unique code on each loaded pallet after the stretch wrap has been applied. In those implementations, the visible features that are captured by the image-based identifier may include visible features of the non-transparent markings as they appear on the marked stretch wrap as applied to the loaded pallet.

In some implementations, a method may be provided that includes capturing, by at least one vision sensor during or after application of stretch wrap to a loaded pallet, a plurality of images while at least one of the vision sensor and the loaded pallet are rotating. Each of the images captures a corresponding portion of the loaded pallet with the stretch wrap applied to the corresponding portion. The method further includes: receiving, by a system of one or more computers, the images of the loaded pallet captured by the vision sensor; generating, by the system, a post-wrap image-based identifier for the loaded pallet based on the images; and assigning, by the system in one or more electronic databases, the post-wrap image-based identifier as an identifier of the loaded pallet. The post-wrap image-based identifier captures one or more visible features of the stretch wrap as applied to the loaded pallet.

This method and other implementations of technology disclosed herein may each optionally include one or more of the following features.

In some implementations, the stretch wrap is applied while the loaded pallet rotates on a turntable and the vision sensor captures the images while the loaded pallet is rotating on the turntable. In some of those implementations, the vision sensor is not rotating when the vision sensor captures the images In some implementations, the images are captured while the vision sensor is rotating around the loaded pallet.

In some implementations, the stretch wrap includes a plurality of non-transparent markings and the visible features of the stretch wrap as applied to the loaded pallet include features of the non-transparent markings as they appear on the stretch wrap as applied to the loaded pallet. In some of those implementations, he stretch wrap applied to the loaded pallet is applied from a roll of stretch wrap and the non-transparent markings are a sequence of non-transparent markings that repeat on the roll of the stretch wrap.

In some implementations, the post-wrap image-based identifier is a three dimensional model generated based on the images. In some of those implementations, the method further includes receiving position data corresponding to the images of the loaded pallet captured by the vision sensor and generating the three dimensional model includes using the position data as a prior in generating the three dimensional model. The position data corresponding to an image of the images indicates a rotational position of at least one of the vision sensor and the loaded pallet when the image was captured and may be correlated to the image based on, for example, timestamps associated with the position data and the image.

In some implementations, generating the post-wrap image-based identifier includes detecting one or more edges in the images and defining the edges as one or more of the visible features of the stretch wrap as applied to the loaded pallet.

In some implementations, generating the post-wrap image-based identifier includes: generating a first side image-based identifier of the post-wrap image-based identifier based on at least one of the images that captures a first side of the loaded pallet; and generating a second side image-based identifier of the post-wrap image-based identifier based on at least one of the images that captures a second side of the loaded pallet.

In some implementations, the method further includes: capturing, by an additional vision sensor of a robot, at least one image of the loaded pallet with the stretch wrap applied; determining, by the robot, that the image matches the image-based identifier based on comparing the image to the image-based identifier; determining, by the robot, a pose of the loaded pallet with the stretch wrap applied; and providing, by the robot, an indication of the image-based identifier and the pose to an inventory tracking system.

In some implementations, the method further includes receiving a plurality of additional images of the loaded pallet captured during or before application of stretch wrap to the loaded pallet. Each of the additional images captures a corresponding portion of the loaded pallet without the stretch wrap applied to the corresponding portion. In some of those implementations, the method further includes: generating, by the system, a pre-wrap image-based identifier for the loaded pallet based on the plurality of additional images; and assigning, by the system in the one or more electronic databases, the pre-wrap image-based identifier as an additional identifier of the loaded pallet. The pre-wrap image-based identifier captures one or more visible features of the loaded pallet without the stretch wrap applied to the loaded pallet.

In some implementations, the method further includes identifying, by the system, one or more attributes of the loaded pallet, and assigning the post-wrap image-based identifier as an identifier of the loaded pallet includes assigning the post-wrap image-based identifier to the one or more attributes.

In some implementations, the method further includes: capturing, by an additional vision sensor of a robot, at least one image of the loaded pallet with the stretch wrap applied; determining, by the robot, that the image matches the post-wrap image-based identifier based on comparing the image to the image-based identifier; identifying, by the robot, the attributes of the loaded pallet based on determining that the image matches the post-wrap image-based identifier; and performing, by the robot, an action to the loaded pallet based on at least one of the attributes. In some of those implementations, the attributes include one or more of: one or more content identifiers of contents of the loaded pallet, a destination identifier of a destination of the loaded pallet, a unique identifier for the loaded pallet, an identifier indicating loaded dimensions of the loaded pallet, and a time identifier that corresponds to a time that the stretch wrap was applied to the loaded pallet.

In some implementations, a method may be provided that includes capturing, by at least one vision sensor during or before application of stretch wrap to a loaded pallet, a plurality of images while at least one of the vision sensor and the loaded pallet are rotating. Each of the images captures a corresponding portion of the loaded pallet without the stretch wrap applied to the corresponding portion. The method further includes: receiving, by a system of one or more computers, the images of the loaded pallet captured by the vision sensor; generating, by the system, a de-palletizing scheme for the loaded pallet based on the images; and assigning, by the system in one or more electronic databases, the de-palletizing scheme to an identifier of the loaded pallet. The de-palletizing scheme defines at least an order for de-palletizing contents of the loaded pallet.

This method and other implementations of technology disclosed herein may each optionally include one or more of the following features.

In some implementations, the identifier of the loaded pallet is a post-wrap image-based identifier that captures one or more visible features of the stretch wrap as applied to the loaded pallet. In some of those implementations, the method further includes: capturing, by the vision sensor during or after application of the stretch wrap to the loaded pallet, a plurality of post-wrap images while at least one of the vision sensor and the loaded pallet are rotating, wherein each of the post-wrap images captures at least some of the stretch wrap applied to the loaded pallet; receiving, by the system, the post-wrap images of the loaded pallet captured by the vision sensor; and generating, by the system, the post-wrap image-based identifier for the loaded pallet based on the post-wrap images.

Other implementations may include a non-transitory computer readable storage medium storing instructions executable by one or more processors to perform a method such as one or more of the methods described above. Yet another implementation may include a system including memory and one or more processors operable to execute instructions, stored in the memory, to implement one or more modules or engines that, alone or collectively, perform a method such as one or more of the methods described above.

It should be appreciated that all combinations of the foregoing concepts and additional concepts described in greater detail herein are contemplated as being part of the subject matter disclosed herein. For example, all combinations of claimed subject matter appearing at the end of this disclosure are contemplated as being part of the subject matter disclosed herein.

BRIEF DESCRIPTION OF THE DRAWINGS

FIG. 2A illustrates an example of a turntable wrapper automated pallet wrapping machine wrapping a loaded pallet and a vision sensor that may be used to capture images of the loaded pallet.

FIG. 2B illustrates a close-up view of a portion of the loaded pallet of FIG. 2A with the stretch wrap applied.

FIG. 5 illustrates an example of capturing pre-wrap images of a loaded pallet, determining one or more attributes of the loaded pallet based on the pre-wrap images, capturing post-wrap images of the loaded pallet, generating a post-wrap image-based identifier of the loaded pallet based on the post-wrap images, and assigning the post-wrap image-based identifier to the attributes of the loaded pallet.

FIG. 6 illustrates an example of capturing pre-wrap images of a loaded pallet, determining a de-palletizing scheme for the loaded pallet based on the pre-wrap images, capturing post-wrap images of the loaded pallet, generating a post-wrap image-based identifier of the loaded pallet based on the post-wrap images, and assigning the post-wrap image-based identifier to the de-palletizing scheme for the loaded pallet.

DETAILED DESCRIPTION

Figure 1:
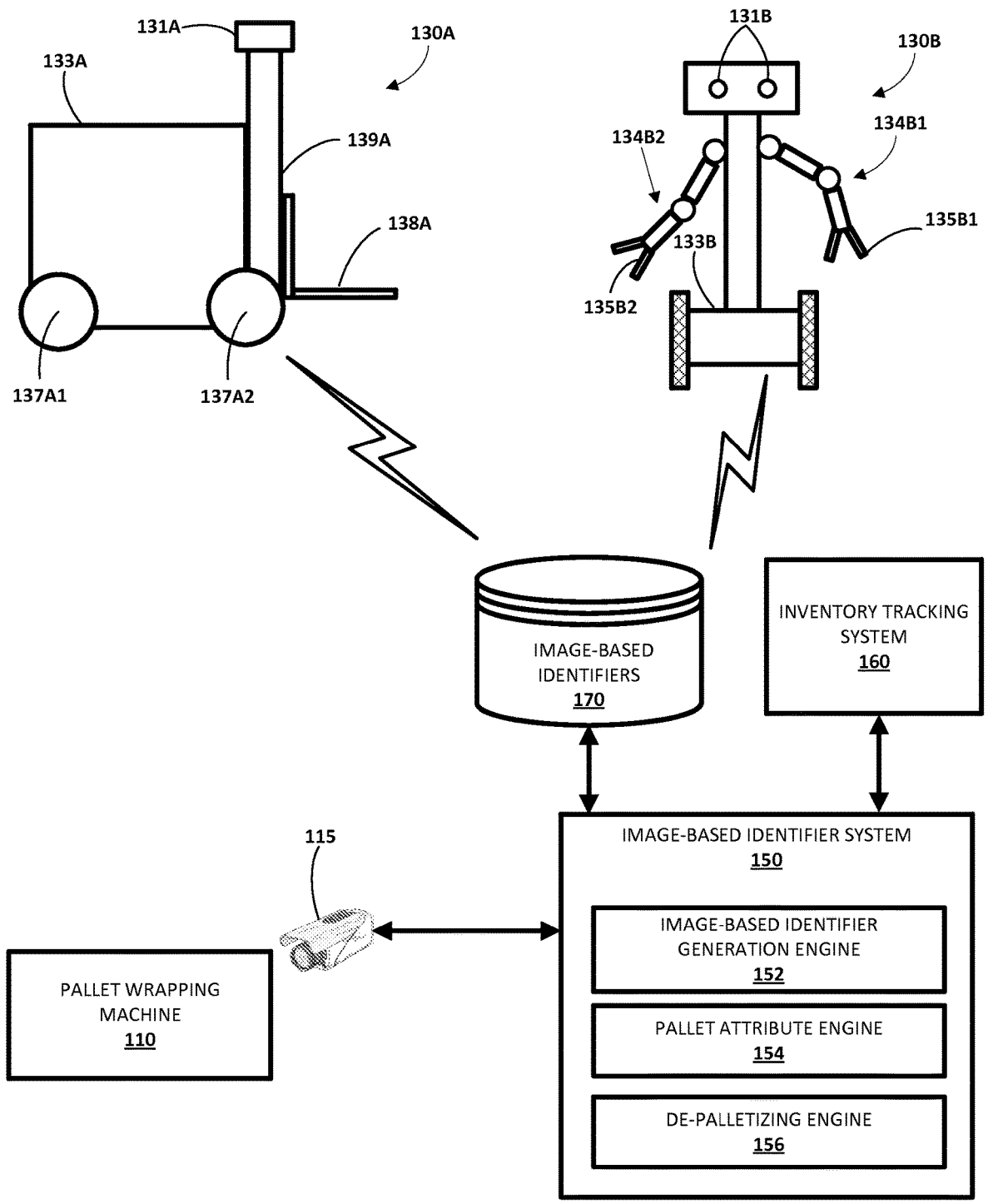
FIG. 1 illustrates an example environment in which techniques described herein may be implemented.

FIG. 1 illustrates an example environment in which techniques described herein may be implemented. Various components of the environment may communicate with one another via one or more networks such as a local area network (LAN) and/or or a wide area network (WAN) such as the Internet. In other implementations, a direct connection between one or more components may be utilized. Wired and/or wireless communication techniques may be utilized.

The example environment includes a pallet wrapping machine 110 and a vision sensor 115. The vision sensor 115 may be, for example, a stereographic camera. A stereographic camera includes two or more sensors (e.g., charge-coupled devices (CCDs)), each at a different vantage point and generates, based on the data sensed by the two sensors, a depth image that includes a plurality of data points defining depth values and color values and/or grayscale values. For example, the stereographic camera may generate images that include a depth channel and red, blue, and/or green channels. Each channel may define a value for each of a plurality of pixels of the image such as a value from 0 to 255 for each of the pixels of the image. In some implementations, the vision sensor 115 may be a camera that generates images that do not define depth values. For example, in some implementations the vision sensor 115 may be a monocular camera that includes a single sensor and generates, based on the data sensed by the sensor, an image that includes a plurality of data points defining color values and/or grayscale values. For instance, the monocular camera may generate images that include red, blue, and/or green channels. In some implementations where a monocular camera is used, depth data may optionally be generated and associated with images captured by the monocular camera using structure from motion techniques and/or other techniques.

The vision sensor 115 is positioned near the pallet wrapping machine 110 so that it has a view of a wrapping area associated with the pallet wrapping machine 110. The wrapping area associated with the pallet wrapping machine 110 encompasses the areas which a loaded pallet occupies during application of stretch wrap to the loaded pallet by the pallet wrapping machine 110. For example, the wrapping area of a turntable wrapper automated pallet wrapping machine may be the turntable of the turntable wrapper and/or the area above the turntable. Also, for example, the wrapping area of a rotary arm wrapper and/or a rotary ring wrapper automated pallet wrapping machine may be a portion of a conveyor or other platform on which a loaded pallet rests while being wrapped by the wrapping machine and/or an area above such a platform.

As described herein, in some implementations the vision sensor 115 captures pre-wrap images and/or post-wrap images of a loaded pallet while the loaded pallet is in the wrapping area and while the vision sensor 115 and/or the loaded pallet are rotating. In other words, there is relative rotation between the vision sensor 115 and the loaded pallet that may be caused by the vision sensor 115 rotating around the loaded pallet while the loaded pallet is non-rotating, the loaded pallet rotating while the vision sensor 115 is non-rotating, and/or both the vision sensor 115 and the loaded pallet rotating. For example, the vision sensor 115 may capture post-wrap images of a loaded pallet during one or more rotations of the loaded pallet on a turntable of a turntable wrapper after it has been wrapped by the turntable wrapper and before it is ejected or otherwise removed from the wrapping area of the turntable wrapper. Also, for example, the vision sensor 115 may capture pre-wrap images of a loaded pallet during one or more rotations of the loaded pallet on a turntable of a turntable wrapper after it has been placed on the turntable wrapper, but before it has been wrapped by the turntable automated wrapping machine.

Also provided in the environment of FIG. 1 is an image-based identifier system 150. Image-based identifier system 150 uses images captured by vision sensor 115 and/or other vision sensor(s) having a view of a wrapping area of the pallet wrapping machine 110 to, for example, generate image-based identifiers of loaded pallets and assign the image-based identifiers as identifiers of the corresponding loaded pallets. System 150 may include one or computing systems connected by one or more networks. An example of such a computing system is depicted schematically in FIG. 10. Various modules or engines may be implemented as part of image-based identifier system 150 as software, hardware, or any combination of the two. For example, in FIG. 1 system 150 includes an image-based identifier engine 152, a pallet attribute engine 154, and a de-palletizing engine 156.

In some implementations, the image-based identifier generation engine 152 is configured to generate a post-wrap image-based identifier for a loaded pallet based on images captured by vision sensor 115 that each capture a corresponding portion of the loaded pallet with stretch wrap applied to the corresponding portion. The generated post-wrap image-based identifier captures one or more visible features of the stretch wrap as applied to the loaded pallet, and optionally one or more visible features of load of the loaded pallet that may be visible through the stretch wrap. The engine 152 may assign the generated post-wrap image-based identifier of a loaded pallet as an identifier of the loaded pallet (and optionally to other attribute(s) of the loaded pallet as described below) in image-based identifiers database 170. As described in more detail herein, the post-wrap image-based identifier of the loaded pallet of database 170 may be utilized by robot 130A, robot 130B, and/or other automated agent(s) for subsequent identification of the loaded pallet in a warehouse or other environment while the loaded pallet remains stretch wrapped.

In some implementations, the image-based identifier generation engine 152 generates an image-based identifier that includes a set of the captured images (e.g., one or more images from each "side" of the pallet), a 3D model of the loaded pallet that is based on the captured images, and/or a set of derived features derived from the captured images. In implementations where the image-based identifier includes derived features derived from captured images, the image-based identifier generation engine 152 may utilize various derived features such as edges based on "wrinkles" in the stretch wrap (e.g., as indicated by color and/or depth variations in the images), "edges" based on what is behind the wrap (e.g., as indicated by color and/or depth variations in the images), "edges" based on overlaps of the stretch wrap, etc. In some implementations where the image-based identifier is a 3D model generated based on images, the image-based identifier generation engine 152 may further receive position data corresponding to the images. In some of those implementations, the position data may be received from encoders and/or other position sensors instrumented on the automated pallet wrapping machine (e.g., instrumented to the turntable of a turntable wrapper or an arm of a rotary arm wrapper) and may be correlated to the images based on, for example, timestamps and/or receipt times of the position data and the images. The position data may provide a strong prior to the engine 152 for 3D reconstruction of the images by the engine 152, potentially enabling lower cost vision sensors (e.g., a standard monocular camera or a lower cost stereographic camera) to be utilized to generate the images used to create the 3D model.

In some implementations, the image-based identifier generation engine 152 may generate a post-wrap image-based identifier that includes a plurality of identifiers, which may be used individually and/or collectively to identify the loaded pallet. For example, the image-based identifier may include a first side image-based identifier based on at least one of the images that captures a first side of the loaded pallet, a second side image-based identifier based on at least one of the images that captures a second side of the loaded pallet, etc. Also, for example, the image-based identifier may include a 3D model (full or partial) that is based on the captured images and a set of derived features that are derived from the 3D model.

In some implementations, the image-based identifier generation engine 152 is additionally or alternatively configured to generate a pre-wrap image-based identifier for a loaded pallet based on images captured by vision sensor 115 that each capture a corresponding portion of the loaded pallet without stretch wrap applied to the corresponding portion.

The generated pre-wrap image-based identifier captures one or more visible features of the loaded pallet without the stretch wrap applied. The engine 152 may assign the generated pre-wrap image-based identifier of a loaded pallet as an identifier of the loaded pallet (and optionally to other attribute(s) of the loaded pallet as described below) in image-based identifiers database 170. As described in more detail herein, the pre-wrap image-based identifier of the loaded pallet of database 170 may be utilized by robot 130A, robot 130B, and/or other automated agent(s) for subsequent identification of the loaded pallet in a warehouse or other environment after its stretch wrap is removed.

In some implementations, the image-based identifier generation engine 152 generates a pre-wrap image-based identifier that includes a set of the captured images (e.g., one or more images from each "side" of the pallet), a 3D model of the loaded pallet that is based on the captured images, and/or a set of features derived from the captured images. In some implementations, the image-based identifier generation engine 152 may generate a pre-wrap image-based identifier that includes a plurality of identifiers, which may be used individually and/or collectively to identify the loaded pallet.

The pallet attribute engine 154 is optional and identifies one or more attributes of a loaded pallet to assign to an image-based identifier of the loaded pallet in image-based identifiers database 170. The attributes of a loaded pallet may include, for example, one or more identifiers of contents of the pallet, an identifier of a destination of the loaded pallet, a unique identifier for the loaded pallet, an identifier indicating loaded height, width, and/or length of the loaded pallet, and/or an identifier of a time that corresponds to a time during which stretch wrap was applied to the pallet by an automated pallet wrapping machine. Identifiers of contents of a loaded pallet may include, for example, specific identifiers that particularly identify the content (e.g., part numbers, serial numbers, model numbers) or generic identifiers that identify a class of the content (e.g., "electronics", "fragile", "high priority"). An identifier of a destination of a loaded pallet may include, for example, an intra-warehouse destination (e.g., "Loading Dock A", "Trailer A") and/or an extra-warehouse destination (e.g., an identifier of a final or intermediary destination warehouse or other environment). An identifier indicating loaded height, width, and/or length of the loaded pallet may indicate values for those measurements and/or may indicate at least one restriction for the pallet based on those measurements. For example, the measurements and/or indicated restriction could be used to inform robot 130A and/or other robots that a loaded pallet may not fit in certain corridors (e.g., where the loaded height, width, and/or length indicates a load of the loaded pallet that overhangs the pallet itself by at least a threshold amount)—and the robot 130A may avoid one or more corridors when transporting the loaded pallet based on the measurements and/or indicated restriction. Also, for example, the measurements and/or indicated restrictions could be used to inform robot 130A and/or other robots that a loaded pallet is not suitable for automated handling and/or is only suited for automated handling by certain robots (e.g., the load is too big or too lopsided)—and the robot 130A may avoid handling the loaded pallet based on the measurements and/or indicated restriction.

In some implementations, the pallet attribute engine 154 identifies one or more of the attributes of a loaded pallet from inventory tracking system 160 or other warehouse management system that tracks contents of pallets being wrapped by an automated wrapping machine. For example, inventory tracking system 160 may provide the pallet attribute engine 154 with identifiers of contents of a loaded pallet that is being wrapped and an identifier of the destination of the loaded pallet. For instance, the inventory tracking system 160 may have directed one or more automated agents and/or human agents to load the pallet with specific content for delivery to a specific destination and may provide the pallet attribute engine 154 with identifiers of the specific content and the specific destination.

In some implementations, the pallet attribute engine 154 additionally or alternatively identifies one or more of the attributes of a loaded pallet based on pre-wrap and/or post-wrap images captured by the vision sensor 115 and/or an additional vision sensor. For example, and as described herein, the vision sensor 115 may also capture images of a loaded pallet "pre-wrap". The pallet attribute engine 154 may use barcodes or other fiducial markings of loaded boxes (or other items) in the pre-wrap images to determine identifiers of the content of the loaded pallet (e.g., the fiducial markings themselves may be utilized as the identifiers or utilized to derive distinct identifiers). As another example, the pallet attribute engine 154 may use a 3D model generated based on post-wrap images to determine measurements and/or indicated restrictions for the loaded pallet. In some implementations where a post-wrap image-based identifier is assigned to attributes of the loaded pallet in image-based identifiers database 170, an additional vision sensor of a robot may capture an image of the loaded pallet with the stretch wrap applied and the robot may determine that the image matches the post-wrap image-based identifier based on comparing the image to the image-based identifier. The robot may further identify the attributes of the loaded pallet that are assigned to the post-wrap image-based identifier and perform an action to the loaded pallet based on at least one of the attributes.

The de-palletizing engine 156 is also optional and uses one or more pre-wrap images of a loaded pallet to generate a de-palletizing scheme for the loaded pallet that may be assigned to an image-based identifier and/or other identifier of the loaded pallet in image-based identifiers database 170. The de-palletizing scheme may be utilized at a future time by one or more robots to de-palletize the loaded pallet. The de-palletizing engine 156 may use the pre-wrap images and optionally one or more of the attributes determined by pallet attribute engine 154 to generate a de-palletizing scheme that optionally optimizes de-palletizing of a loaded pallet in view of one or more optimization criteria such as time and/or resources (e.g., number and/or types of robots utilized) optimization criteria. In some implementations, the de-palletizing engine 156 may determine a de-palletizing scheme that defines the order in which items will be removed from the loaded pallet and defines the locations to which the items will be transferred. For example, the de-palletizing engine 156 may determine such a de-palletizing scheme in view of the positions of the boxes (or other items) in the pre-wrap images, contents of the boxes (or other items), and/or destination(s) of the boxes (or other items).

In some implementations, the de-palletizing engine 156 generates the de-palletizing scheme for a loaded pallet using pre-wrap images captured prior to or during wrapping of the loaded pallet with stretch wrap and generates the de-palletizing scheme prior to the stretch wrap being subsequently removed from the pallet. This may enable de-palletizing of the loaded pallet by one or more automated agents to begin more quickly after the stretch wrap is removed than other techniques that may rely on images of the pallet captured after the stretch wrap is removed (since the de-palletizing scheme is generated before the stretch wrap is removed). For example, the vision sensor 115 may capture pre-wrap images of a loaded pallet during one or more rotations of the loaded pallet on a turntable of a turntable wrapper before it is wrapped with stretch wrap by the turntable automated wrapping machine—and the de-palletizing engine 156 may generate a de-palletizing scheme based on those pre-wrap images prior to the stretch wrap being removed from the loaded pallet.

Two robots 130A and 130B are also illustrated in the example environment of FIG. 1. The robots 130A and 130B may be located in an environment such as a building (e.g., a warehouse, a manufacturing facility, an office building), one or more buildings of a collection of buildings (e.g., an origination warehouse and a destination warehouse), one or more floors of a multi-floor office or other building, etc. Additional and/or alternative robots may be provided in other implementations, such as additional robots that vary in one or more respects from those illustrated in FIG. 1.

The robot 130A is a pallet jack robot that includes a plurality of forks 138A coupled to an elevator 139A. The elevator 139A raises and lowers the forks 138A to enable pallets and/or other objects to be lifted off of the ground and repositioned. The robot 130A also includes a base 133A with four wheels (wheels 137A1 and 137A2 are illustrated) provided thereon for locomotion of the robot 130A. The base 133A may include, for example, one or more motors for driving corresponding wheels to achieve a desired direction, velocity, and/or acceleration of movement for the robot 130A. In some implementations, the wheels of the robot 130A may be controlled autonomously and/or semi-autonomously and/or the elevator 139A may be controlled autonomously and/or semi-autonomously. For example, the robot 130A may lift and reposition pallets and may drive its wheels autonomously and/or adjust the height of the forks 138A autonomously to position the forks 138A in fork holes of the pallet.

The robot 130A also includes various sensors such as vision sensor 131A, which may be, for example, a stereographic camera. The vision sensor 131A may capture one or more images of a loaded pallet and the robot 130A may compare the images to one or more of the image-based identifiers of database 170 to determine an image-based identifier that matches the captured images. In some implementations, the robot 130A may determine a pose of the loaded pallet and provide an indication of the matching image-based identifier and an indication of the pose to the inventory tracking system 160. For example, the robot 130A may determine the pose of the loaded pallet based on the images and/or the robot's own pose and provide the pose and the image-based identifier to the inventory tracking system 160 to enable the inventory tracking system 160 to track the poses of the loaded pallet over time and to store the poses and associated timestamps in one or more databases.

In some implementations, the robot 130A may additionally and/or alternatively determine whether and/or how to reposition a loaded pallet based on an image-based identifier that matches one or more images of the loaded pallet, and optionally based one or more attributes assigned to the image-based identifier in the database 170. For example, the inventory tracking system 160 and/or other automated warehouse system may communicate to robot 130A one or more image-based identifiers of loaded pallets that are to be repositioned and the robot 130A may reposition any loaded pallet whose image(s) match one of those image-based identifiers, optionally using one or more attributes assigned to the image-based identifiers to determine a destination for the loaded pallet. Also, for example, the inventory tracking system 160 and/or other automated warehouse system may communicate to robot 130A one or more attributes of loaded pallets that are to be repositioned and the robot 130A may reposition any loaded pallet whose images match an image-based identifier assigned to those attributes in database 170.

In some implementations, one or more processors of the robot 130A may determine one or more images captured by the vision sensor 131A matches an image-based identifier that is a 3D model (full or partial) of a loaded pallet. In some of those implementations, the robot 130A may determine the images match the 3D model based on, for each of a plurality of data points of the images: translating the model's origin to the data point, rotating the model in a plurality (e.g., all possible) directions for that translation, projecting the model to the data points for each rotation of the model, and calculating the difference (e.g., the Euclidian distance) between the values defined by the model and the data points at each of the rotations. Accordingly, the robot 130A calculate differences for each of a plurality of projections of the model to the data points, where each projection is unique (e.g., each projection is a unique "translation of the model to a data point", "rotation of the model" pair). The robot 130A may identify the images match the model if one of the projections satisfies some "satisfactory minimum" threshold. In some implementations, the robot 130A may further select the projection with the minimal differences and determine the pose of the object based on the pose of the model at the selected projection. Since that projection satisfies the threshold, it is "closest" to the object in the real world and the pose can be estimated based on the pose of the model at the selected projection. For example, the determined pose may be the same as the pose of the model at the selected projection.

Stated differently, for each of a plurality of projections of a model to data points of an image, the robot 130A may calculate differences between the model and the data points for a corresponding projection; the robot 130A may determine a projection of the projections satisfies a threshold based on the differences between the model and the data points for that projection; and the robot 130A may determine the object is present based on that projection satisfying the threshold and/or may determine the pose of the object based on the pose of the projection. Additional or alternative techniques may be utilized to determine one or more images of a loaded pallet match an image-based identifier. For example, an edge detector may be ran on one or more images of a loaded pallet captured by a robot and may also be ran on one or more images that define the image-based identifier. The output of the edge detector ran on the one or more images of the loaded pallet may be compared to the output of the edge detector ran on the images that define the image-based identifier to determine if they match.

The robot 130B includes robot arms 134B1 and 134B2 with corresponding end effectors 135B1 and 135B2, that each take the form of a gripper with two opposing "fingers" or "digits." The robot 130B also includes a base 133B with wheels 137B1 and 137B2 provided on opposed sides thereof for locomotion of the robot 130B. The base 133B may include, for example, one or more motors for driving corresponding wheels 137B1 and 137B2 to achieve a desired direction, velocity, and/or acceleration of movement for the robot 130B.

The robot 130B also includes various sensors such as vision sensor 131B, which may be a stereographic camera. In some implementations, the wheels 137B1, 137B2 of the robot 130B may be controlled autonomously and/or semi-autonomously and/or the robot arms 134B1, 134B2 and end effectors 135B1, 135B2 may be controlled autonomously and/or semi-autonomously. For example, the robot 130B may remove stretch wrap from loaded pallets and/or pick up and remove objects from loaded pallets, and the robot 130B may drive the wheels 137B1 and 137B2 and the arms 134B1 and 134B2 autonomously to enable the robot 130B to remove stretch wrap and/or pick up an object from the loaded pallet.

The vision sensor 131B may capture one or more images of a loaded pallet and the robot 130B may compare the images to one or more of the image-based identifiers of database 170 to determine an image-based identifier that matches the captured images. In some implementations, the robot 130B may determine a pose of the loaded pallet and provide an indication of the matching image-based identifier and the pose to the inventory tracking system 160. In some implementations, the robot 130B may additionally and/or alternatively determine whether to remove stretch wrap from a pallet and/or whether and/or how to de-palletize a loaded pallet based on the matching image-based identifier, and optionally based one or more attributes and/or de-palletizing schemes assigned to the matching image-based identifier in the database 170. In some implementations, the inventory tracking system 160 and/or other automated warehouse system may communicate to robot 130B one or more image-based identifiers of loaded pallets that are to be de-palletized and the robot 130B may remove stretch wrap from any loaded pallet whose images match one of those image-based identifiers. Also, in some implementations the inventory tracking system 160 and/or other automated warehouse system may communicate to robot 130B one or more attributes of loaded pallets that are to be de-palletized and the robot 130B may remove stretch wrap from any loaded pallet whose images match an image-based identifier assigned to those attributes in database 170. In some implementations, the inventory tracking system 160 and/or other automated warehouse system may communicate to robot 130B one or more image-based identifiers of loaded pallets that are to be de-palletized and the robot 130B may de-palletize those loaded pallets based on de-palletizing schemes assigned to those image-based identifiers by de-palletizing engine 156.

The image-based identifiers and optional assigned attributes and/or de-palletizing schemes of database 170 may be stored in the database 170 in various manners. For example, the database 170 may be an index with image-based identifiers being index values that each point to tuples that each include one or more corresponding attributes and/or de-palletizing schemes. Also, for example, the database 170 may have a graph topology with the image-based identifiers being nodes and the attributes and/or de-palletizing schemes also being nodes. The image-based identifier nodes may each be connected to attribute nodes, de-palletizing scheme nodes, and/or other image-based identifier nodes (e.g., a post-wrap image-based identifier of a loaded pallet may be connected to a pre-wrap image-based identifier of that loaded pallet) by one or more edges.

FIG. 2A illustrates an example of a turntable wrapper 210 automated pallet wrapping machine wrapping a loaded pallet 207 that is loaded with a plurality of boxes, two of which are labeled with 209. The turntable wrapper 210 includes a turntable 216 on which the loaded pallet 207 is placed. The loaded pallet 207 is rotated on the turntable 216 while being wrapped with stretch wrap 205 fed from a roll of stretch wrap that is mounted on an assembly 214 that moves vertically up and/or down a mast 212 during the wrapping. FIG. 2A also illustrates a vision sensor 215 that may be used to capture post-wrap images of corresponding portions of the loaded pallet with the stretch wrap applied. The vision sensor 215 is mounted to mast 217 and is approximately 180 degrees out of phase with the assembly 214 and the mast 212. In some implementations, the vision sensor 215 may move vertically up and/or down the mast 217 and/or pan and/or tilt while capturing images of the loaded pallet 207. In some implementations, the vision sensor 215 may remain in a fixed position on the mast 217 and/or may otherwise be mounted in a fixed position.

The vision sensor 215 has a view of the wrapping area of the turntable wrapper 210. In FIG. 2A, the wrapping of the loaded pallet 207 with the stretch wrap 205 is nearly complete. In some implementations, after the wrapping is complete, the applied stretch wrap may be severed (e.g., physically cut, pulled taut to break, or otherwise severed) from the roll of stretch wrap that is mounted on the assembly 214, and the turntable 216 may subsequently be rotated 360 degrees one or more times and the vision sensor 215 may capture post-wrap images during the subsequent rotation(s). The captured images may be provided to image-based identifier system 150 (FIG. 1) to generate one or more post-wrap image-based identifiers as described herein. In some implementations, the vision sensor 215 may optionally move vertically up and/or down the mast 217 while capturing post-wrap images of the loaded pallet 207, depending on the field of view of the vision sensor 215; pan, tilt, and/or zoom capabilities of the vision sensor 215; the desired resolution of captured images; and/or other factors. In some implementations, the vision sensor 215 may capture one or more post-wrap images of the loaded pallet while the stretch wrap 205 is still being applied to the loaded pallet 207. For example, the vision sensor 215 may move vertically up and/or down the mast 217 to generally follow the movement of the assembly 214 up and/or down the mast 212 and capture post-wrap images of corresponding portions of the loaded pallet 207.

In some implementations, the vision sensor 215 may additionally or alternatively capture pre-wrap images of the loaded pallet 207 during one or more rotations of the turntable 216. For example, the turntable 216 may be rotated 360 degrees one or more times prior to application of the stretch wrap 205 to the loaded pallet 207 and the vision sensor 215 may capture pre-wrap images during those rotation(s). The captured images may be provided to image-based identifier system 150 (FIG. 1) to generate one or more pre-wrap image-based identifiers, to determine pallet attributes, and/or to determine a de-palletizing scheme as described herein. In some implementations, the vision sensor 215 may optionally move vertically up and/or down the mast 217 while capturing pre-wrap images of the loaded pallet 207. In some implementations, the vision sensor 215 may capture one or more pre-wrap images of the loaded pallet while the stretch wrap 205 is being applied to the loaded pallet 207.

In some implementations, the turntable 216 may be instrumented with encoders and/or other position sensors. In those implementations, position data may be provided by the position sensors to the image-based identifier generation engine 152 and may be correlated to the images based on, for example, timestamps and/or receipt times of the position data and the images. The position data may provide a strong prior to the engine 152 for enabling the engine 152 to create an image-based identifier such as a 3D model based on the images captured by the vision sensor 215.

FIG. 2B illustrates a close-up view of a portion of the loaded pallet of FIG. 2A with the stretch wrap applied. FIG.

2B illustrates edges 205A and 205B that may be present in images captured by vision sensor 215. The edges 205A and 205B are present where stretch wrap 205 overlaps and may be included in an image-based identifier. For example, the edges may be captured in images and/or a 3D model image-based identifier and/or as derived features of an image-based identifier. Also, in FIG. 2B wrinkles in the stretch wrap are also present immediately above edge 205A and may be captured in images and/or a 3D model image-based identifier and/or as derived features of an image-based identifier. Post-wrap image-based identifiers of the loaded pallet 207 will be unique from other post-wrap image-based identifiers of other loaded pallets wrapped by the turntable wrapper 210 based on, for example, the starting point of the stretch wrap 205 in wrapping the loaded pallet 207 and the other loaded pallets, the load size of the loaded pallet 207 and the other loaded pallets, the load configuration of the loaded pallet 207 and the other loaded pallets, the speed of the turntable 216 during the wrappings, tension of the stretch wrap 205 during the wrappings, etc.

Although a particular turntable wrapper 210 and a particular location of the vision sensor 215 are illustrated in FIG. 2A, multiple variations are possible. For example, the vision sensor 215 may be in a different location, the vision sensor 215 may be movable in additional directions, and/or multiple vision sensors may be provided. As another example, different turntable wrapper automated wrapping machines and/or other non-turntable wrapper automated wrapping machines may be utilized. For instance, a vision sensor may be coupled to an arm of a rotary arm automated wrapping machine and/or to a ring of a rotary ring automated wrapping machine and may rotate around the loaded pallet after application of the stretch wrap to the loaded pallet.

Figure 3B:
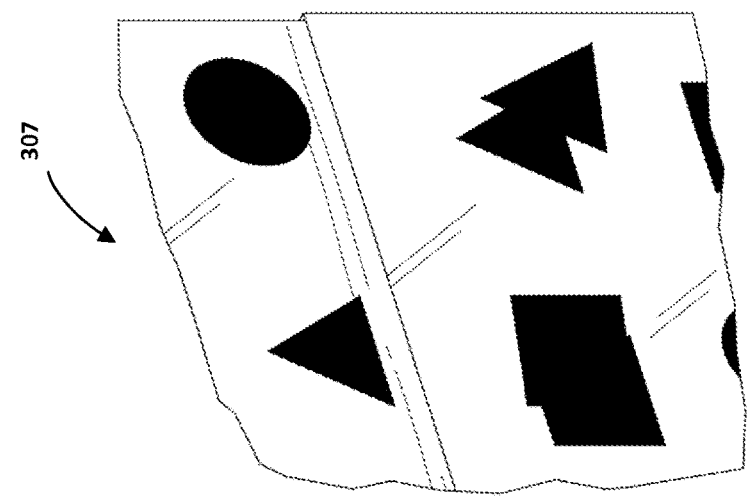
FIG. 3B illustrates an example of portions of the stretch wrap of FIG. 3A applied to a loaded pallet.
Figure 3A:
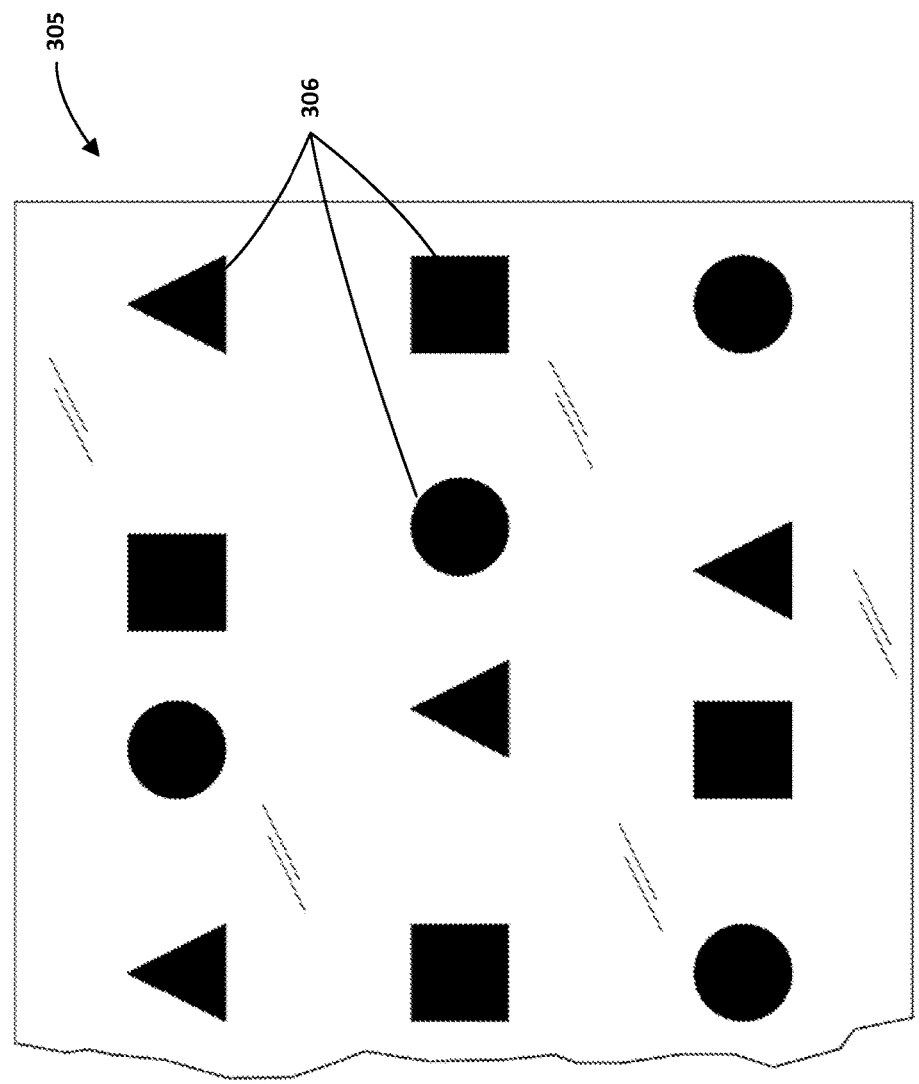
FIG. 3A illustrates an example of stretch wrap that includes a plurality of non-transparent markings.

FIG. 3A illustrates an example of a portion 305 of marked stretch wrap that includes a plurality of non-transparent markings, some of which are labeled as 306. In the example of FIG. 3A, the portion 305 of marked stretch wrap is illustrated in a flat non-stretched state (e.g., it is a portion that has been pulled off of a roll without stretching it). Also, in the example of FIG. 3A the non-transparent markings are all illustrated as black and opaque. However, in other implementations one or more of the non-transparent markings may be fully and/or partially translucent and/or may include one or more colors other than black.

The non-transparent markings of FIG. 3A include three rows of shapes. In each of the rows, a sequence of a triangle, circle, and square is provided and the sequence may optionally repeat on non-illustrated portions of the marked stretch wrap (e.g., to the left of the leftmost illustrated triangle of the top-most row a square may be provided that is optionally spaced the same distance as the illustrated square of the top-most row is from the rightmost illustrated triangle, a circle may be provided to the left of that square, etc.). It is noted that in each of the rows the spacing between one or more of the shapes in the sequence of shapes is unique. For example, in the first row the circle and square are spaced more closely than the circle and square in the second and third rows. Also, for example, in the third row the square and triangle are spaced more closely than the square and triangle in the first and second rows.

Although specific shapes and a specific arrangement of those shapes is illustrated in FIG. 3A, various additional and/or alternative non-transparent markings and/or arrangements may be provided. For example, in some implementations lines, alphanumeric characters, and/or symbols may be provided in addition to or as an alternative to shapes. Also, for example, in some implementations only a single row of shapes and/or other markings may be provided. Also, for example, in some implementations non-transparent markings may be non-linearly arranged relative to one another.

The marked stretch wrap illustrated in part in FIG. 3A may be utilized instead of typically applied clear stretch-wrap. For example, the portion 305 may be included on a roll of marked stretch wrap and the roll may be provided and utilized with the rotary wrapper 210 of FIG. 2A in lieu of the roll illustrated in FIG. 2A. In implementations where marked stretch wrap is utilized, the visible features that are captured by a post-wrap image-based identifier generated according to techniques described herein may include visible features of the non-transparent markings as they appear on the marked stretch wrap as applied to the loaded pallet.

For example, FIG. 3B illustrates an example 307 of the marked stretch wrap that is illustrated in part in FIG. 3A after it has been applied to a loaded pallet. In the example 305A, the shapes are stretched somewhat relative to FIG. 3A due to the application process. Moreover, in FIG. 3B the arrangement of some of the shapes differs due to the application process. For example, two triangles are partially overlapping in FIG. 3B and two squares are partially overlapping in FIG. 3B due to overlapping of the marked stretch wrap in the application process. Also, for example, the alignment and the orientation of some of the shapes differs due to the wrapping starting point in the application process, the wrap tension, the movement of the wrap (e.g., up/down) and/or of the turntable during the application process, and/or other factors.

As will be appreciated in view of the disclosure herein, even in implementations where a roll of marked stretch wrap includes the same pattern of non-transparent markings that repeats over and over again, the markings of the marked stretch wrap may still appear different when wrapped on different loaded pallets based on, for example, the starting point of the marked stretch wrap in wrapping the loaded pallets, the load size of the loaded pallets, the load configuration of the loaded pallets, the speed of a turntable and/or rotary arms/rings during the wrappings, tension of the marked stretch wrap during the wrappings, etc.

Figure 4:
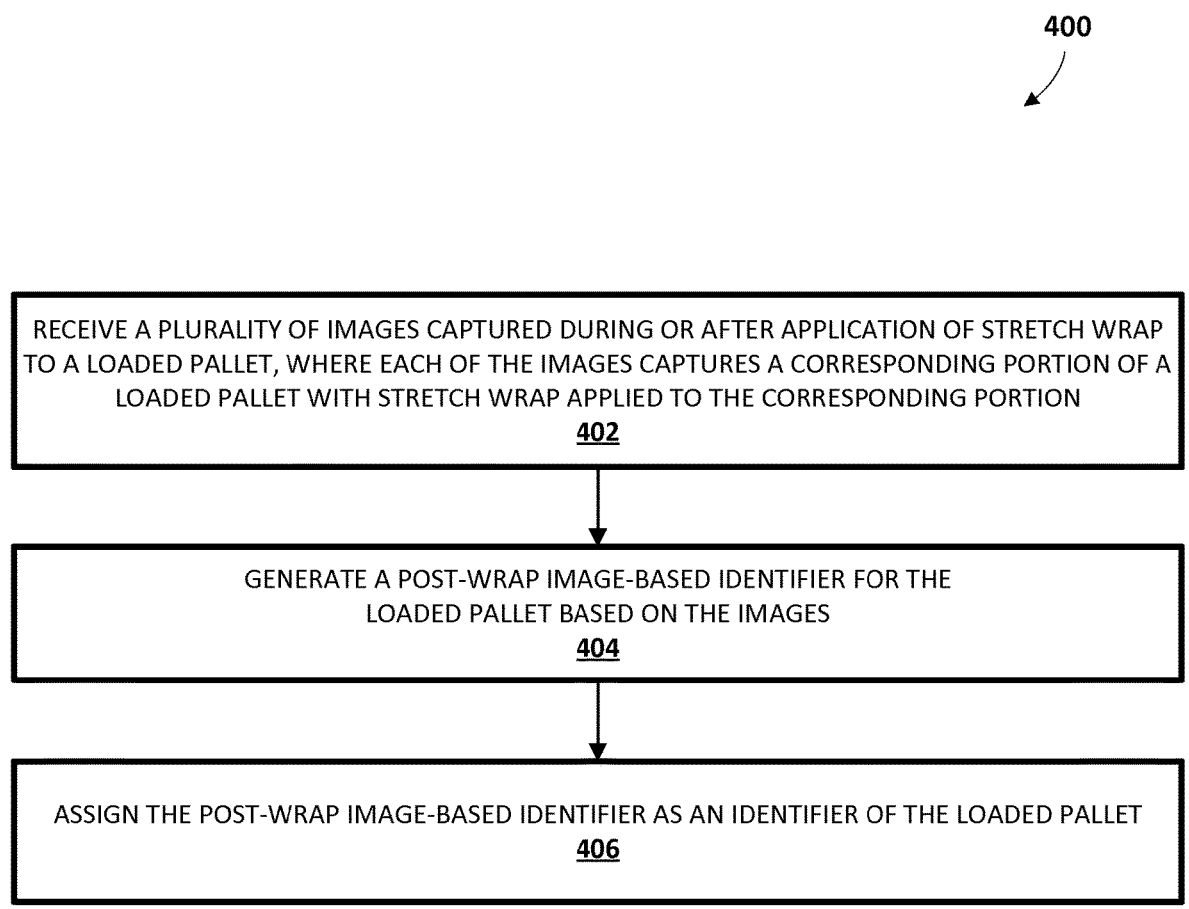
FIG. 4 depicts a flow chart illustrating an example method of capturing images of a loaded pallet during or after stretch wrap is applied to the loaded pallet by a pallet wrapping machine and using the images to generate a post-wrap image-based identifier for the loaded pallet.

FIG. 4 depicts a flow chart illustrating an example method 400 of capturing images of a loaded pallet during or after stretch wrap is applied to the loaded pallet by a pallet wrapping machine and using the images to generate a post-wrap image-based identifier for the loaded pallet. For convenience, the operations of the flow chart are described with reference to a system that performs the operations. This system may include various components of various computer systems, such as image-based identifier engine 152 of FIG. 1. Moreover, while operations of method 400 are shown in a particular order, this is not meant to be limiting. One or more operations may be reordered, omitted or added.

At block 402, the system receives a plurality of images captured during or after application of stretch wrap to a loaded pallet. Each of the images captures a corresponding portion of a loaded pallet with stretch wrap applied to the corresponding portion. For example, the system may receive images from a vision sensor that captures images of the loaded pallet "post-wrap" while the loaded pallet is in a wrapping area of an automated wrapping machine that applies the stretch wrap to the loaded pallet. The images may be captured by the vision sensor while other portions are still being stretch wrapped and/or captured after the stretch wrapping is completed (e.g., in one or more rotations of the loaded pallet following completion of the stretch wrapping of the loaded pallet). The vision sensor may capture the images while the vision sensor and/or the loaded pallet are rotating. For example, the vision sensor may remain stationary (or move only "vertically") and may capture the images while the loaded pallet is rotating on a turntable of a turntable wrapper automated wrapping machine after application of the stretch wrap to the loaded pallet. As another example, the vision sensor may be coupled to an arm of a rotary arm wrapper automated wrapping machine and/or to a ring of a rotary ring wrapper automated wrapping machine and may rotate around the loaded pallet after application of the stretch wrap to the loaded pallet.

At block 404, the system generates a post-wrap image-based identifier for the loaded pallet based on the images received at block 402. For example, the system may generate a post-wrap image-based identifier that includes a set of the captured images (e.g., one or more images from each "side" of the pallet), a "3D" model of the loaded pallet that is based on the captured images, and/or a set of derived features derived from the captured images At block 406, the system assigns the post-wrap image-based identifier as an identifier of the loaded pallet. In some implementations, the system may further assign the post-wrap image-based identifier to pallet attributes and/or a de-palletizing scheme of the loaded pallet.

With reference to FIGS. 5-8, various non-limiting examples are provided of image-based identifiers that may be determined by image-based identifier system 150 of FIG. 1 and various items that may be determined and assigned to those image-based identifiers by system 150.

In FIG. 5, pre-wrap images 101 of a loaded pallet are captured by a vision sensor and provided to pallet attribute engine 154. Pallet attribute engine 154 determines pallet attributes based on the pre-wrap images 101 and provides the pallet attributes to image-based identifier generation engine 152. For example, the pallet attributes engine 154 may provide identifiers of the contents of the loaded pallet as pallet attributes based on barcodes or other fiducial markings of loaded boxes (or other items) in the pre-wrap images 101. Post-wrap images 102 of the loaded pallet are also captured by the vision sensor and provided to the image-based identifier generation engine 152. The image-based identifier generation engine 152 generates a post-wrap image-based identifier based on the post-wrap images 102. The image-based identifier generation engine 152 assigns the post-wrap image-based identifier to the pallet attributes provided by pallet attribute engine 154 and stores the post-wrap image-based identifier and assigned pallet attributes in image-based identifiers database 170. Robots 130A and 130B and/or other robots may utilize the post-wrap image-based identifier and optionally the assigned pallet attributes for various purposes. For example, the robot 130A may capture an image of the stretch wrapped loaded pallet utilizing a corresponding vision sensor and match the image to the post-wrap image-based identifier. The robot 130A may further identify the pallet attributes assigned to the post-wrap image-based identifier and perform one or more actions to the loaded pallet based on the assigned pallet attributes.

In FIG. 6, pre-wrap images 101 of a loaded pallet are captured by a vision sensor and provided to de-palletizing engine 156. De-palletizing engine 156 generates a de-palletizing scheme based on the pre-wrap images 101 and provides the de-palletizing scheme to image-based identifier generation engine 152. For example, the de-palletizing engine 156 may generate a de-palletizing scheme in view of the positions of the boxes (or other items) in the pre-wrap images 101, contents of the boxes (or other items) (e.g., based on barcodes or other fiducial markings in the pre-wrap images 101), and/or destination(s) of the boxes (or other items) (e.g., based on fiducial markings in the pre-wrap images 101). For instance, the de-palletizing engine 156 may generate a de-palletizing scheme that defines the order in which items will be removed from the loaded pallet and the locations to which the items will be transferred.

Post-wrap images 102 of the loaded pallet are also captured by the vision sensor and provided to the image-based identifier generation engine 152. The image-based identifier generation engine 152 generates a post-wrap image-based identifier based on the post-wrap images 102. The image-based identifier generation engine 152 assigns the post-wrap image-based identifier to de-palletizing scheme provided by the de-palletizing engine 156 and stores the post-wrap image-based identifier and assigned de-palletizing scheme in image-based identifiers database 170. Robots 130A and 130B and/or other robots may utilize the post-wrap image-based identifier and optionally the assigned de-palletizing scheme for various purposes. For example, the robot 130B may capture an image of the stretch wrapped loaded pallet utilizing a corresponding vision sensor and match the image to the post-wrap image-based identifier. The robot 130B may further identify the de-palletizing scheme assigned to the post-wrap image-based identifier and perform one or more actions to the loaded pallet based on the de-palletizing scheme. For instance, the robot 130B may remove the stretch wrap from the stretch wrapped loaded pallet and begin de-palletization of the loaded pallet based on the de-palletization scheme.

Figure 7:
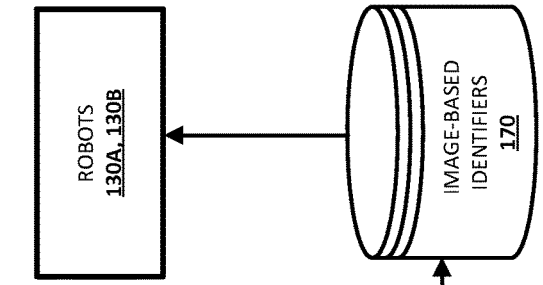
FIG. 7 illustrates an example of capturing pre-wrap images of a loaded pallet, determining a de-palletizing scheme for the loaded pallet based on the pre-wrap images, generating a pre-wrap image-based identifier of the loaded pallet based on the pre-wrap images, and assigning the pre-wrap image-based identifier to the de-palletizing scheme for the loaded pallet.
Figure 7:
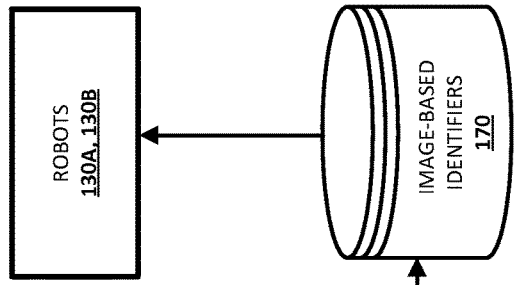

In FIG. 7, pre-wrap images 101 of a loaded pallet are captured by a vision sensor and provided to de-palletizing engine 156. De-palletizing engine 156 generates a de-palletizing scheme based on the pre-wrap images 101 and provides the de-palletizing scheme to image-based identifier generation engine 152. The pre-wrap images 101 are also provided to the image-based identifier generation engine 152. The image-based identifier generation engine 152 generates a pre-wrap image-based identifier based on the pre-wrap images 101. The image-based identifier generation engine 152 assigns the pre-wrap image-based identifier to the de-palletizing scheme provided by the de-palletizing engine 156 and stores the pre-wrap image-based identifier and assigned de-palletizing scheme in image-based identifiers database 170. Robots 130A and 130B and/or other robots may utilize the pre-wrap image-based identifier and optionally the assigned pallet attributes for various purposes. For example, the robot 130B may capture an image of the loaded pallet with the stretch wrap removed utilizing a corresponding vision sensor and match the image to the pre-wrap image-based identifier. The robot 130B may further identify the de-palletizing scheme assigned to the pre-wrap image-based identifier and perform one or more actions to the loaded pallet based on the de-palletizing scheme. For instance, the robot 130B may begin de-palletization of the loaded pallet based on the de-palletization scheme.

Figure 8:
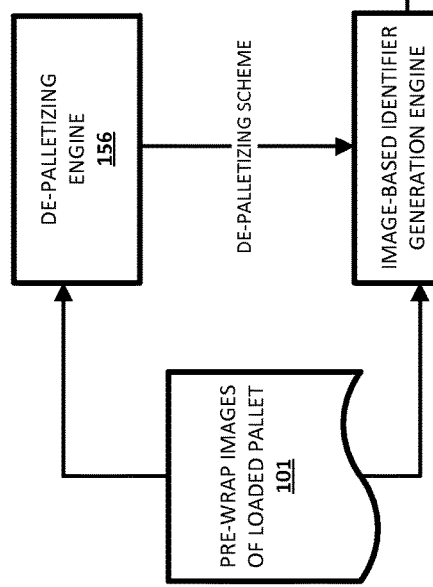
FIG. 8 illustrates an example of capturing pre-wrap images of a loaded pallet, capturing post-wrap images of the loaded pallet, generating a pre-wrap image-based identifier of the loaded pallet based on the pre-wrap images, generating a post-wrap image-based identifier of the loaded pallet based on the post-wrap images, and assigning the pre-wrap and post-wrap image-based identifiers as identifiers for the loaded pallet.

In FIG. 8, pre-wrap images 101 of the loaded pallet and post-wrap images 102 of the loaded pallet are both provided to the image-based identifier generation engine 152. The image-based identifier generation engine 152 generates a pre-wrap image-based identifier based on the pre-wrap images 101. The image-based identifier generation engine 152 also generates a post-wrap image-based identifier based on the post-wrap images 102. The image-based identifier generation engine 152 assigns both the pre-wrap image-based identifier and the post-wrap image-based identifier as identifiers for the loaded pallet in image-based identifiers database. Robots 130A and 130B and/or other robots may utilize the pre-wrap image-based identifier and/or the post-wrap image-based identifier for various purposes. For example, the robot 130A may capture an image of the loaded pallet with the stretch wrap applied utilizing a corresponding vision sensor and match the image to the post-wrap image-based identifier. The robot 130A may further determine a pose of the loaded pallet based on the captured image and/or its own position and provide an indication of the post-wrap image-based identifier and the pose to an inventory tracking system. Also, for example, the robot 130A may capture an image of the loaded pallet with the stretch wrap removed utilizing a corresponding vision sensor and match the image to the pre-wrap image-based identifier. The robot 130A may further determine a pose of the loaded pallet based on the captured image and/or its own position and provide an indication of the pre-wrap image-based identifier and the pose to an inventory tracking system.

Although FIGS. 5-8 are provided as separate examples, one or more aspects from one or more of the examples may be combined in various implementations. For example, a post-wrap image-based identifier and/or a pre-wrap image-based identifier may be assigned to both pallet attributes and to a de-palletizing scheme in some implementations.

Although various figures and examples above are described with respect to stretch wrap, in some implementations one or more techniques described herein may be used to generate an image-based identifier for loaded pallets that are wrapped with other materials. For example, in some implementations an automated wrapping machine may be utilized to apply shrink wrap, paper wrap, or other material to a loaded pallet; images of the loaded pallet captured after such material is applied; and the images utilized to generate an image-based identifier. For example, in some implementations shrink wrap may be applied, heated, then one or more images of the heated shrink wrap captured by a vision sensor while at least one of the vision sensor and the loaded pallet are rotating. Those captured images may be utilized to generate an image-based identifier as described herein.

Figure 9:
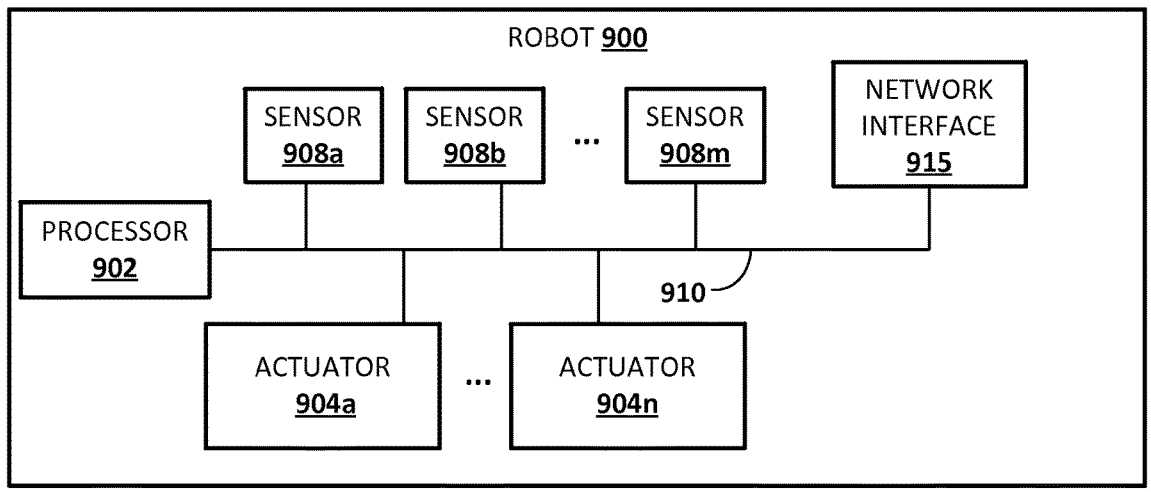
FIG. 9 schematically depicts an example architecture of a robot.

FIG. 9 schematically depicts an example architecture of a robot. Robot 900 may take various forms, including but not limited to a form similar to robot 130A, robot 130B, a telepresence robot, a humanoid form, an animal form, a wheeled device, an unmanned aerial vehicle ("UAV"), and so forth. In various implementations, robot 900 may include a processor 902. Processor 902 may take various forms, such as, for example, one or more central processor units, one or more graphics processor units, one or more field-programmable gate arrays ("FPGA"), and/or one or more application-specific integrated circuits ("ASIC").

In various implementations, processor 902 may be operably coupled with one or more actuators 904$a$-$n$ and/or one or more sensors 908$a$-$m$, e.g., via one or more buses 910. Sensors 908$a$-$m$ may take various forms, including but not limited to laser scanners, cameras, depth sensors, light sensors, pressure sensors, pressure wave sensors (e.g., microphones), proximity sensors, accelerometers, gyroscopes, thermometers, barometers, and so forth. While sensors 908$a$-$m$ are depicted as being integral with robot 900, this is not meant to be limiting. In some implementations, one or more sensors 908$a$-$m$ may be located external to robot 900, e.g., as standalone units.

Processor 902 may provide control commands to the actuators 904$a$-$n$ and/or the sensors 908$a$-$m$ to accomplish one or more tasks such as grasping boxes or other items, lifting pallets, moving pallets, placing pallets, etc. Actuators 904$a$-$n$ may include, for example, one or more end effectors and/or one or more servo motors or other actuators to effectuate movement of one or more components of the robot. For example, the robot 900 may have multiple degrees of freedom and each of the actuators 904$a$-$n$ may control actuation of the robot 900 within one or more of the degrees of freedom responsive to the control commands. As used herein, the term actuator encompasses a mechanical or electrical device that creates motion (e.g., a motor), in addition to any driver(s) that may be associated with the actuator and that translate received control commands into one or more signals for driving the actuator. Accordingly, providing a control command to an actuator may include providing the control command to a driver that translates the control command into appropriate signals for driving an electrical or mechanical device to create desired motion.

Processor 902 may execute instructions to determine that one or more images of a loaded pallet captured by one of the sensors 908$a$-$m$ matches an image-based identifier based on comparing the image to the image-based identifier. In some of those implementations, processor 902 may further determine a pose of the loaded pallet based on the images and/or the position of the robot 900 and optionally provide an indication of the image-based identifier and an indication of the pose to an inventory tracking system or other warehouse management system (optionally in combination with a time-stamp).

The processor 902 may further provide real time bursts of data to the actuators 904 $a$-$n$, with each of the real time bursts including a set of one or more control commands that dictate, inter alia, the parameters of motion (if any) for each of one or more of the actuators 904$a$-$n$. In some implementations, control commands may be generated by processor 902 to adjust the position of one or more operational components of the robot 900 based on an image-based identifier that matches images captured by one or more of the sensors 908$a$-$m$ of the robot 900 as described herein and/or based on attributes and/or a de-palletizing scheme assigned to the matching image-based identifier.

Processor 902 may additionally or alternatively establish a network connection with one or more computer systems external to the robot 900 via network interface subsystem 915 and provide one or more images captured by one or more of the sensor 908$a$-$m$ to the external computer systems to enable the computer systems to match the images to an image-based identifier based on comparing the images to the image-based identifier. The external computer systems may optionally provide the matching image-based identifier and/or attributes and/or a de-palletizing scheme assigned to the matching image-based identifier to the robot 900 to influence one or more control commands generated by the processor 902. Network interface subsystem 915 provides an interface to outside networks and is coupled to one or more corresponding interface devices in one or more other computer systems. In some implementations, robot 900 may incorporate, in addition to other components, one or more aspects of a computer system, such as computer system 1010 described below.

Figure 10:
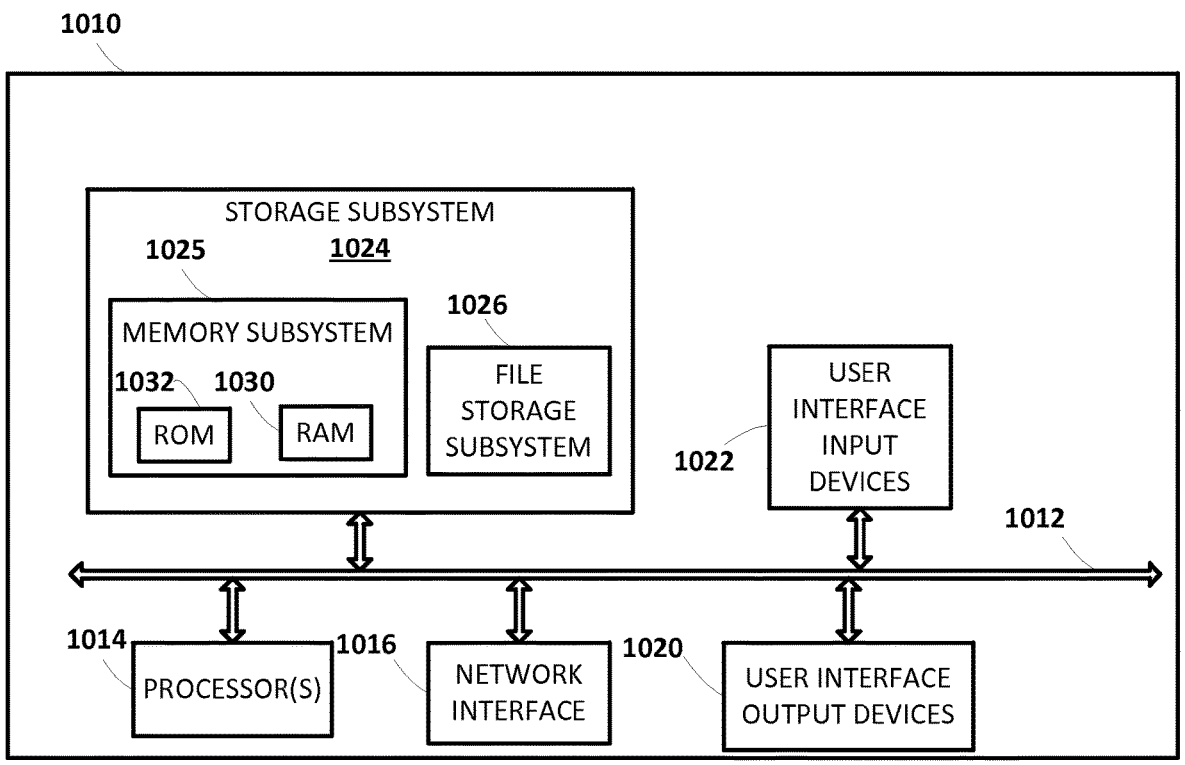
FIG. 10 schematically depicts an example architecture of a computer system.

FIG. 10 is a block diagram of an example computer system 1010. Computer system 1010 typically includes at least one processor 1014 which communicates with a number of peripheral devices via bus subsystem 1012. These peripheral devices may include a storage subsystem 1024, including, for example, a memory subsystem 1025 and a file storage subsystem 1026, user interface output devices 1020, user interface input devices 1022, and a network interface subsystem 1016. The input and output devices allow user interaction with computer system 1010. Network interface subsystem 1016 provides an interface to outside networks and is coupled to corresponding interface devices in other computer systems.

User interface input devices 1022 may include a keyboard, pointing devices such as a mouse, trackball, touchpad, or graphics tablet, a scanner, a touchscreen incorporated into the display, audio input devices such as voice recognition systems, microphones, and/or other types of input devices. In general, use of the term "input device" is intended to include all possible types of devices and ways to input information into computer system 1010 or onto a communication network.

User interface output devices 1020 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computer system 1010 to the user or to another machine or computer system.

Storage subsystem 1024 stores programming and data constructs that provide the functionality of some or all of the modules described herein. For example, the storage subsystem 1024 may include the logic to perform selected aspects of method 400, examples of FIGS. 5-8, and/or to implement one or more aspects of processor 902, engine 152, engine 154, engine 156, and/or inventory tracking system 160. Memory 1025 used in the storage subsystem 1024 can include a number of memories including a main random access memory (RAM) 1030 for storage of instructions and data during program execution and a read only memory (ROM) 1032 in which fixed instructions are stored. A file storage subsystem 1026 can provide persistent storage for program and data files, and may include a hard disk drive, a CD-ROM drive, an optical drive, or removable media cartridges. Modules implementing the functionality of certain implementations may be stored by file storage subsystem 1026 in the storage subsystem 1024, or in other machines accessible by the processor(s) 1014.

Bus subsystem 1012 provides a mechanism for letting the various components and subsystems of computer system 1010 communicate with each other as intended. Although bus subsystem 1012 is shown schematically as a single bus, alternative implementations of the bus subsystem may use multiple busses.

Computer system 1010 can be of varying types including a workstation, server, computing cluster, blade server, server farm, smart phone, smart watch, smart glasses, set top box, tablet computer, laptop, or any other data processing system or computing device. Due to the ever-changing nature of computers and networks, the description of computer system 1010 depicted in FIG. 10 is intended only as a specific example for purposes of illustrating some implementations. Many other configurations of computer system 1010 are possible having more or fewer components than the computer system depicted in FIG. 10.

What is claimed is:

1. A method, comprising:
capturing, by at least one vision sensor prior to application of stretch wrap around a plurality of boxes, one or more pre-wrap images of the plurality of boxes;
determining, based on the one or more pre-wrap images of the plurality of boxes, one or more attributes of the plurality of boxes;
capturing, by the at least one vision sensor or an additional vision sensor, and during or after application of the stretch wrap around the plurality of boxes:
a plurality of post-wrap images, wherein each of the post-wrap images captures a corresponding portion of the stretch wrap as applied around the plurality of boxes;
receiving, by a system of one or more computers, the post-wrap images captured by the vision sensor;
generating, by the system, a post-wrap image-based identifier based on the post-wrap images, the post-wrap image-based identifier capturing one or more visible features of the stretch wrap as applied around the plurality of boxes; and
assigning, by the system in one or more electronic databases, the post-wrap image-based identifier to the one or more attributes of the plurality of boxes.

2. The method of claim 1, wherein the stretch wrap includes a plurality of non-transparent markings and wherein the visible features of the stretch wrap as applied around the plurality of boxes include features of the non-transparent markings as they appear on the stretch wrap as applied around the plurality of boxes.

3. The method of claim 2, wherein the stretch wrap applied around the plurality of boxes is applied from a roll of stretch wrap and wherein the non-transparent markings are a sequence of non-transparent markings that repeat on the roll of the stretch wrap.

4. The method of claim 2, wherein the non-transparent markings comprise one or more shapes, one or more alphanumeric characters, and/or one or more symbols.

5. The method of claim 4, wherein the non-transparent markings comprise the one or more shapes.

6. The method of claim 5, wherein the one or more shapes comprise a triangle, a circle, and/or a square.

7. The method of claim 1, wherein the post-wrap image-based identifier is a three dimensional model generated based on the post-wrap images.

8. The method of claim 1, wherein generating the post-wrap image-based identifier comprises detecting one or more edges in the post-wrap images and defining the one or more edges as one or more of the visible features of the stretch wrap as applied around the plurality of boxes.

9. The method of claim 1, wherein the one or more attributes include one or more content identifiers of contents of the plurality of boxes.

10. The method of claim 1, wherein the one or more attributes include a destination identifier of a destination of the plurality of boxes.

11. The method of claim 1, further comprising:
capturing, by a further vision sensor, at least one image of the plurality of boxes with the stretch wrap applied around the plurality of boxes;
determining that the image matches the post-wrap image-based identifier based on comparing the image to the post-wrap image-based identifier;
determining, based on the image, a pose of the plurality of boxes with the stretch wrap applied; and
in response to determining that the image matches the post-wrap image-based identifier:
providing an indication of the image-based identifier and the pose to an inventory tracking system.

12. The method of claim 1, further comprising:
capturing, by a further vision sensor, at least one image of the plurality of boxes with the stretch wrap applied around the plurality of boxes;
determining that the image matches the post-wrap image-based identifier based on comparing the image to the image-based identifier;
identifying the one or more attributes based on the one or more attributes being assigned to the post-wrap image-based identifier and based on determining that the image matches the post-wrap image-based identifier; and
performing, to the plurality of boxes with the stretch wrap applied, at least one action that is based on at least one of the attributes.

13. The method of claim 12, wherein the at least one action comprises a repositioning action performed by at least one robot.

14. The method of claim 13, wherein the at least one of the attributes, based on which the at least one action is performed, comprises a destination identifier of a destination of the plurality of boxes.

15. A system comprising:
a vision sensor;
at least one computer system in communication with the vision sensor and receiving post-wrap images that are captured by the vision sensor after application of stretch wrap around a plurality of boxes,
wherein each of the post-wrap images captures a corresponding portion of the stretch wrap as applied around the plurality of boxes, and
wherein the stretch wrap includes a plurality of non-transparent markings;
wherein the computer system includes memory storing instructions that, when executed by the computing system, cause the computing system to:
generate a post-wrap image-based identifier based on the post-wrap images,
wherein the post-wrap image-based identifier captures one or more visible features of the stretch wrap as applied around the plurality of boxes, and
wherein the visible features of the stretch wrap as applied around the plurality of boxes include features of the non-transparent markings as they appear on the stretch wrap as applied around the plurality of boxes; and
assign, in one or more electronic databases, the post-wrap image-based identifier to one or more attributes of the plurality of boxes.

16. The system of claim 15, wherein executing the instructions further cause the computing system to:
determine the one or more attributes of the plurality of boxes based on one or more pre-wrap images, of the plurality of boxes, captured prior to application of the stretch wrap around the plurality of boxes.

17. The system of claim 15, wherein executing the instructions further cause the computing system to:
receive, from an additional vision sensor, at least one image of the plurality of boxes with the stretch wrap applied around the plurality of boxes;
determine that the image matches the post-wrap image-based identifier based on comparing the image to the post-wrap image-based identifier.

18. The system of claim 17, wherein executing the instructions further cause the computing system to:
determine, based on the image and based on the image matching the post-wrap image-based identifier, a pose of the plurality of boxes with the stretch wrap applied; and
provide an indication of the image-based identifier and the pose to an inventory tracking system.

19. The system of claim 17, wherein executing the instructions further cause the computing system to:
identify the one or more attributes based on the one or more attributes being assigned to the post-wrap image-based identifier and based on determining that the image matches the post-wrap image-based identifier; and
cause performance, to the plurality of boxes with the stretch wrap applied, of at least one action that is based on at least one of the attributes.

20. The system of claim 19, wherein the at least one action comprises a repositioning action, and wherein the at least one of the attributes, based on which the at least one action is performed, comprises a destination identifier of a destination of the plurality of boxes.

* * * * *